Feb. 20, 1951  C. D. GALLOWAY  2,542,503
APPARATUS FOR CASTING CONNECTING STRAPS ON
BATTERY TERMINAL LUGS
Filed Nov. 8, 1946  6 Sheets-Sheet 1

FIG·1

INVENTOR
CHARLES DOUGLAS GALLOWAY
BY
Edward J. Dwyer
ATTORNEY

Feb. 20, 1951 C. D. GALLOWAY 2,542,503
APPARATUS FOR CASTING CONNECTING STRAPS ON
BATTERY TERMINAL LUGS
Filed Nov. 8, 1946 6 Sheets-Sheet 3

INVENTOR
CHARLES DOUGLAS GALLOWAY
BY
Edward J. Dwyer
ATTORNEY

Patented Feb. 20, 1951

2,542,503

UNITED STATES PATENT OFFICE 2,542,503

APPARATUS FOR CASTING CONNECTING STRAPS ON BATTERY TERMINAL LUGS

Charles Douglas Galloway, Wyndmoor, Pa., assignor to The Electric Storage Battery Company, a corporation of New Jersey Application November 8, 1946, Serial No. 708,672

11 Claims. (Cl. 22—58)

This invention relates to apparatus for casting straps on the conducting lugs of assemblages of storage battery plates In my copending applications, now United States Patents 2,454,051 and 2,454,053, assigned to the assignee of this invention, there are disclosed improved apparatus and processes for casting straps on assembled storage battery elements whereby the lug tips are welded to the straps The apparatus includes an open cavity mold adapted to receive the plate lugs of inverted battery elements and to receive molten metal poured around the ends of the lugs, with means for superheating the tips of the lugs and the contiguous metal to provide an autogenous weld.

This invention is directed to improvements in the apparatus disclosed in the prior application, and it is an object of this invention to provide means for cyclic introduction into the mold of a predetermined quantity of molten metal at a predetermined temperature, such predetermined quantity being the precise quantity required to form an integral strap and terminal post for connecting one set of positive or negative plates.

Further object of the invention is to provide apparatus for casting straps on assemblages of storage battery plates, which apparatus automatically carries out in cycles the steps of introducing a predetermined quantity of metal into a ladle, melting the metal in the ladle, transferring and tilting the ladle into pouring position, superheating the metal thus poured into the mold cavity, cooling the metal and ejecting the casting are performed in sequence, thereby to cast straps in minimum time and at minimum cost.

It is a further object of the invention to provide ladles in which a predetermined quantity of metal in the solid state is melted for introduction into a mold cavity with means for automatically moving the ladles at predetermined intervals to pour the molten contents thereof into mold cavities.

It is a further object of the invention to provide apparatus for casting straps and terminal posts integral therewith to the desired final dimensions without the necessity for trimming.

It is a further object of the invention to provide for supporting assembled storage battery elements during the superheating and cooling operations by resilient means that engage the separators, whereby the lugs are not subjected to stresses such as might cause their deformation or faulting, and yet the assembled element is free to move vertically in response to contraction or expansion of the lugs.

Storage batteries commonly comprise a plurality of cells connected in series by external metallic intercell connectors joined to terminal posts cast integrally with the straps. To reduce the mass of metal required for intercell connectors, it is common practice to position each terminal post unsymmetrically with reference to the length of the strap, as close as practicable to the adjacent cell to which the post is connected by the intercell connector, except that the two terminal posts which form the ultimate terminals of the battery commonly are positioned centrally of the length of their straps. In the case of a three-cell battery, such positioning of the posts necessitates the use of a different shape of casting for each of the six straps, and consequently each of the three assembled elements of plates, separators and straps is different from the other two as to relative location of its terminal posts.

It is accordingly a further object of the present invention to provide apparatus for casting straps and posts on assembled elements of plates and separators simultaneously in sets of a number equal to the number of cells in the completed battery, or higher multiples thereof, the elements of each set being of the types needed to form one battery.

These and other objects of the invention will appear from the following description of one embodiment thereof, taken in connection with the accompanying drawings in which.

For purposes of illustration, I have shown the apparatus as being of the type for casting straps on elements used to make a three-cell battery of the automotive type having four unsymmetrically positioned terminal posts and two symmetrically positioned terminal posts. It is to be understood, however, that the apparatus may be varied to cast straps on elements for batteries of different design or for casting straps on plate groups retained in suitable jigs without departing from the invention.

In the drawings, 10 represents the vertical members, 11 the horizontal longitudinal members and 12 the horizontal cross members of the supporting structure or frame, surmounted by a platform 13, which supports a bed plate 14 upon which are shown three casting devices A1, A2 and A3 arranged for simultaneously casting the straps and terminal posts on three storage battery elements that are to be used to form one three-cell battery. The devices are identical except that extensions on the mold cavities, within which the terminal posts are cast, are positioned differently to provide the six types of strap castings and three types of elements needed to construct such a battery. If the battery were to have posts positioned centrally of the length of the straps, as some batteries are constructed, the three devices would be fully identical. The device shown at A1 is to be described, it being understood that the description applies to the devices shown at A2 and A3 except as noted.

Figure 3:
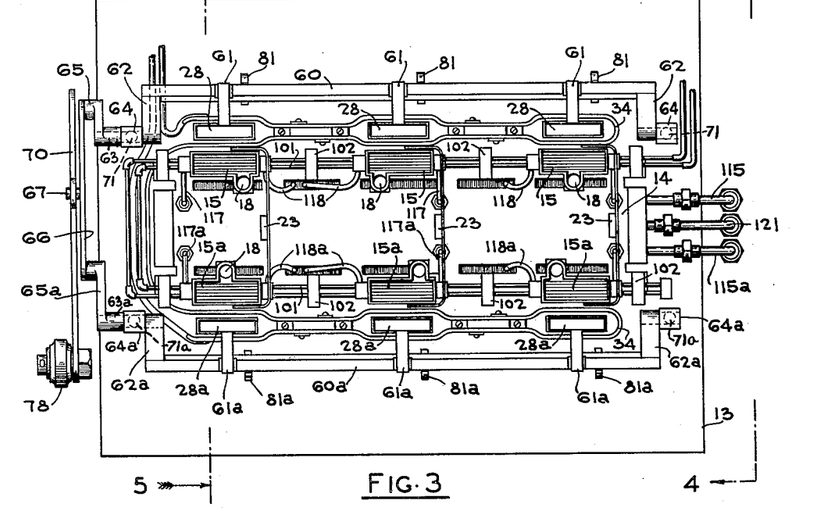
Figure 3 is a top plan view of a portion of the apparatus as seen from the line 3—3 of Figure 2 with the assembled elements 16 and supporting means 30 with attached parts removed.
Figures 5, 6:
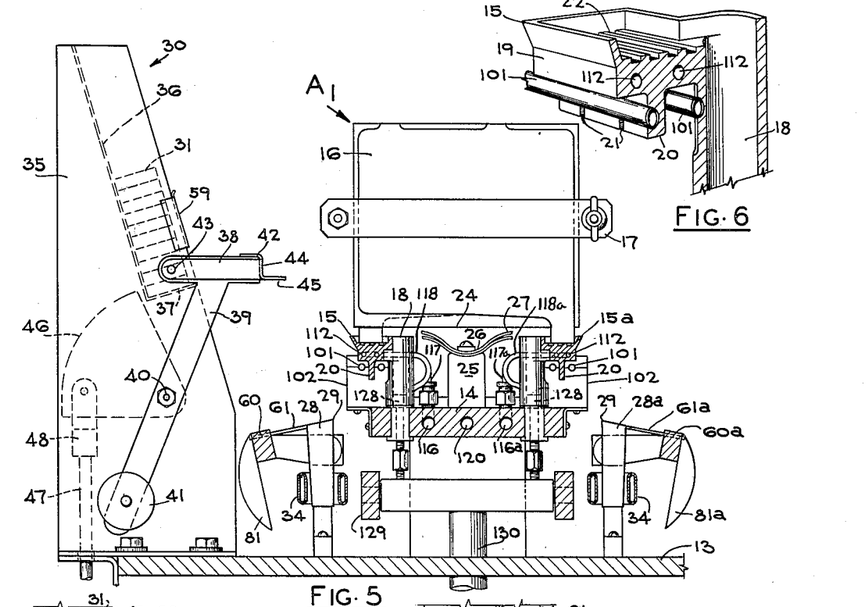
Figure 5 is a sectional view to an enlarged scale of the upper portion of the apparatus taken substantially on the line 5—5 of Figure 3.
Figure 6 is a sectional perspective view to an enlarged scale of the mold showing the details of its construction and the arrangements of the high frequency conductors adjacent thereto.

With particular reference to Figures 3 and 5, it is seen that each casting device includes an opposed pair of open cavity molds 15 and 15a, into which are inserted, respectively, the positive and negative plate lugs of an inverted storage battery element 16, assembled with alternating positive and negative plates and intermeshed separators, clamped in their final relative positions by a clamping device 17. Each mold cavity is provided with a downwardly extending conical extension 18 to provide for casting terminal posts integrally with the straps. The extensions are positioned to cast the posts in the desired position with reference to the length of the straps, and in the case of a common type of three-cell battery, wherein four of the posts are positioned unsymmetrically and two symmetrically, would be positioned as illustrated in Figure 3.

The details of construction of the molds are best shown in Figure 6. Preferably each mold is formed as a unitary machined shape and comprises a main body portion 19 within which the cavity is formed and from which the walls of the cavity extension 18 depend. The body portion also has a depending integral heat transfer member 20 extending the length thereof, and which preferably has transverse slits 21 to limit distortion due to thermal processes. Preferably the floor of the mold is ribbed, as indicated at 22, to provide even distribution of heat throughout the width and length thereof. The mold construction illustrated herein forms the subject of my Patents Nos. 2,454,051 and 2,496,991.

Upwardly extending positioning stops 23, Fig. 3, are fixed to the bed plate adjacent an end of each mold to enable an operator to place the assembled elements within the casting devices accurately and expeditiously.

As most clearly shown in Figure 5, prior to the casting operation the element 16 is supported on the tips of the plate lugs which rest on the floors of the mold cavities 15 and 15a, in which position the horizontal edges 24 of the separators are spaced a short distance above the rim of the cavity. Beneath each element and supported on a block 25, is a U-shaped leaf spring 26 which has horizontally extending tips 27 positioned immediately under but spaced slightly from the horizontal edges of the separators. In casting the straps around the plate lugs, as hereinafter described, the tips of the lugs are melted and the element settles down until the horizontal edges of the separators rest on the tips of the spring, which then yieldingly supports the weight of the element just before it has settled sufficiently to bring the edges of the separators into contact with the rims of the mold cavities. Thus, should the molten metal surrounding the plate lugs, on solidifying, undergo vertical shrinkage tending to pull the element down slightly, this can occur, by reason of the yielding of the supporting spring, without subjecting the plate lugs to undue stress which might cause faulting. The foregoing process involving the settling of the element is disclosed and claimed in my Patent No. 2,502,373.

Pouring ladles 28 and 28a are shown in the form of open top rectangular cups whose upper peripheries are beveled to provide pouring lips 29. The pouring face of each ladle is preferably ribbed to provide for uniform longitudinal distribution of the material poured from the ladle. Six of these pouring ladles are provided, one on each side of each of the three elements, together with their cam operated supporting mechanism hereinafter described.

For each ladle there are provided means 30 for supporting a stack of metal slugs 31 of predetermined size and means for transferring, at predetermined intervals, a slug from the bottom of the stack to the ladle. The preferred design of slug is illustrated in detail in Figure 9. The slug includes a body portion 32 having laterally extending protrusions 33 adjacent each end. When a slug is delivered to a ladle, it enters the ladle with the protrusions directed downwardly and they are the first part of the slug to engage the floor of the ladle. Due to the relatively small surface area of the faces of the protrusions, the tendency for any liquid present in the ladles to splash is reduced or eliminated. If desired, the slugs may be coated with a flux or protective agent to prevent any oxidation such as might cause a build-up of residue in the ladle. One of the slug transferring devices is shown in various operating positions in Figures 5, 7 and 8, and will now be described.

In Figure 5, at the left, is shown a ladle in position to receive a metal slug. The ladle, in this position, is surrounded by the high frequency heating coil 34 to be later described. At 35 is shown an upright support for an open front, rectangular trough 36 slightly inclined from the vertical and adapted to hold a stack of metal slugs 31 supported at the bottom on the lower end wall 37 of the trough.

At 38 is shown a slug transfer bucket rigidly attached to an arm 39, which arm is pivotally supported at 40 on the upright support 35 and is provided with a counterpoise 41 at the end opposite the bucket. The counterpoise is proportioned to hold the arm and empty bucket in the position shown in Figure 5, but when a metal slug has been transferred to the bucket, as hereinafter described, the weight of the slug overbalances the weight of the counterpoise, and the arm and bucket are tilted to the position shown in Figure 8. The bucket 38 is provided with a cap 42 which is pivoted at 43 to the bucket and rests by its own weight in the position shown in Figures 5 and 7, its end 44 covering the open end of the bucket and thus preventing the metal slug from sliding out while the bucket is tilting into the position shown in Figure 8. The cap is provided with a projection 45 which, when the bucket approaches the position shown in Figure 8, comes in contact with the lip 29 of the ladle 28, and on further motion the cap is raised into the position shown in Figure 8, releasing the slug, which thereupon slides into the ladle. The bucket, being thus relieved of the weight of the slug, is thereupon restored by the counterpoise to the position shown in Figure 5 in readiness to receive another slug.

To commence a cycle in the operation of the machine, the lowermost slug of each stack is slid from the stack to the cooperating bucket 38 by a cam-operated sector 46, one of which is provided in cooperative relation with each trough and transfer bucket. The sectors 46 are pivoted at 40 to turn about the same axis as the arms 39, and are adapted, when rotated, to pass through slots in the bottom walls of the troughs. Sectors 46 may be viewed edge-on, at right angles to the view of Figure 5, in Figure 1.

Figure 1:
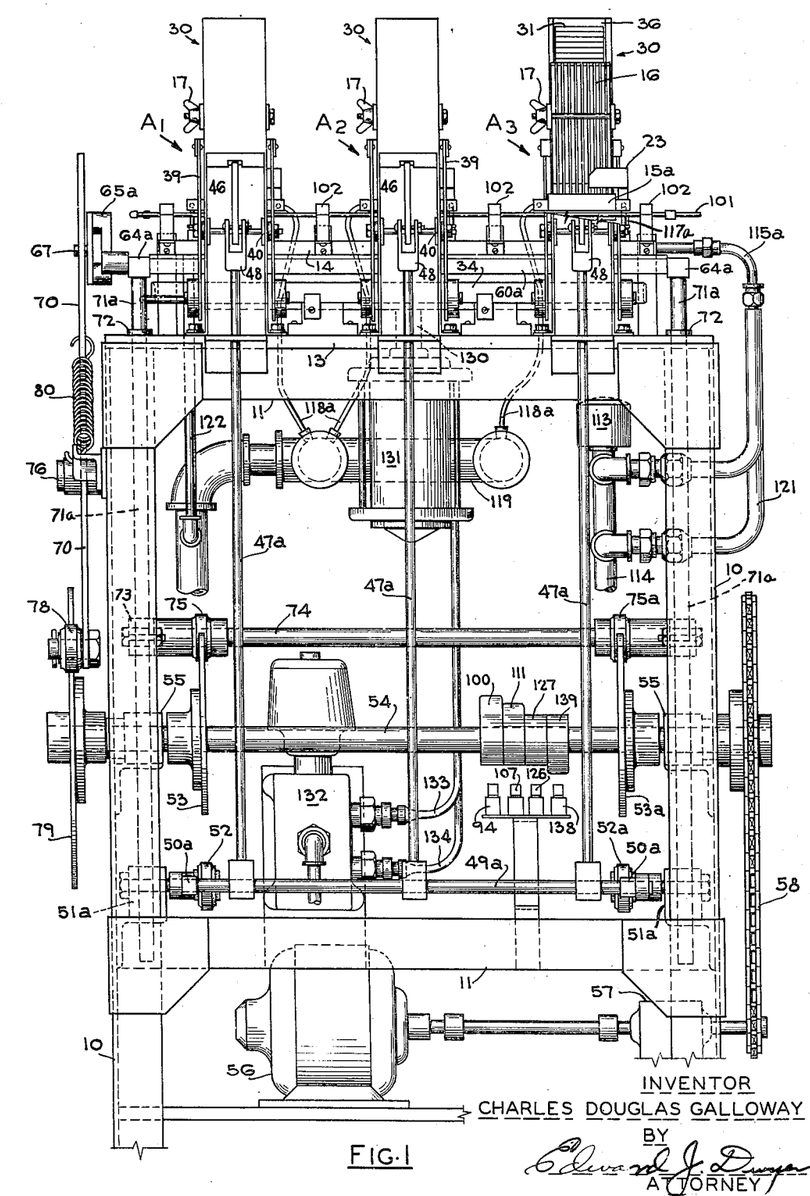
Figure 1 is a side elevational view of an apparatus embodying features of the present invention with certain parts removed to disclose details.
Figure 2:
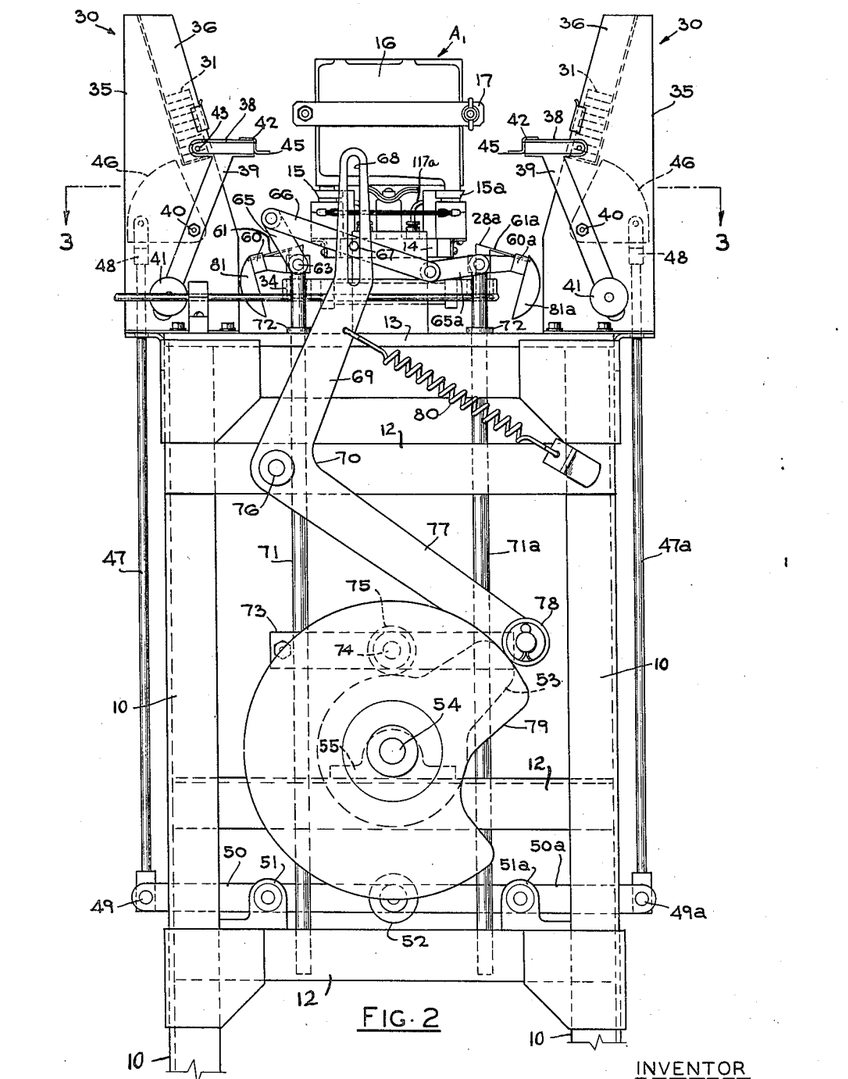
Figure 2 is an elevational view of the apparatus of Fig. 1 as viewed from the left end thereof.

The sectors 46 are rotated about pivots 40 by means of vertical rods 47 and 47a joined at their upper ends to said sectors by clevises 48 and pivotally joined at their lower ends to horizontal rods 49 and 49a that extend longitudinally of the machine adjacent the lower portion, one of which, rod 49a, may be seen in Figure 1. The rods 49 and 49a are fixed to the outboard ends of lever arms 50 and 50a pivoted to bearings 51 and 51a on the frame to rock on horizontal axes on the left and right-hand sides of the machine, respectively (Figure 2). The arm 50 (Figure 7) at one end of the machine is equipped with a roller or cam follower 52, and the arm 50a (Figure 2) at the opposite end is equipped with a similar roller or cam follower 52a, adapted to be engaged by cams 53 and 53a, respectively, mounted on a cam shaft 54 near the opposite ends thereof (Figures 1 and 2).

The cam shaft 54 is journalled in suitable bearings 55 on the frame and on said shaft are fixed the various cams that actuate the various mechanisms of the machine in a manner hereinafter explained. Suitable means are provided for driving the cam shaft, as for example, the motor 56, reduction gears 57 and chain and sprocket mechanism 58 (see Figure 1). The specific construction of the driving mechanism per se does not form a part of the present invention and hence is not described or shown in further detail.

Figure 7:
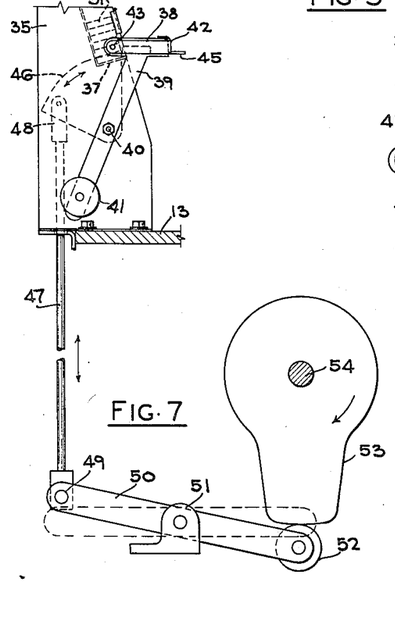
Figure 7 is a side elevational view of the cam operated device for transferring a metal slug from the stack to the transfer bucket.

In Figure 7 there is illustrated the means for operating the slug transferring mechanisms at the left-hand side of the device. Said means include the arm 50 provided at its right-hand or inboard end with the roller or follower 52 adapted to be engaged by the cam 53. Although not shown other than in Figures 1 and 2, the arm 50a at the right-hand side and opposite end of the machine is similar in appearance and function to operate slug transferring mechanisms on that side.

When the follower 52 is out of contact with the cam 53, the sector 46 and rod 47 drop by gravity into the position shown by dotted lines in Figure 5, and the arm 50 assumes the position shown by dotted lines in Figure 7. When the cam has rotated to engage the follower, as shown in Figure 7, the rod 47 is lifted to rotate the sector 46 into the position shown in Figure 7, thereby pushing the slug at the bottom of the stack into the transfer bucket 38. During this motion, the arcuate edge of the sector passes under and supports the balance of the slugs in the stack. When the cam 53 has passed out of contact with the follower 52, the sector again drops by gravity into the position shown in Figure 5 and the stack of slugs slides down to bring another slug into position to be pushed into the bucket. A guard plate 59 is shown across the open face of the trough 36 located just above the lowermost slug to prevent the slug next above from being displaced by frictional contact with the lowermost slug while the latter is being pushed into the transfer bucket.

Figure 8:
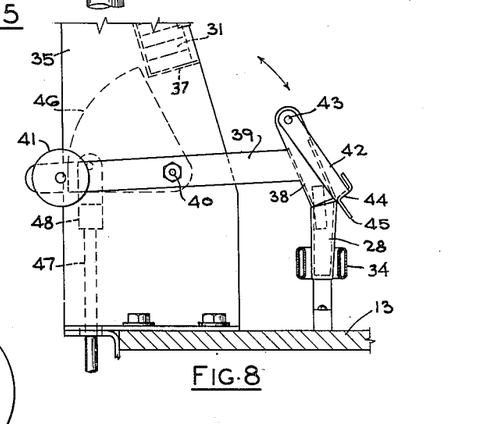
Figure 8 shows the transfer bucket in delivery position.

As hereinbefore stated, as soon as a slug has been pushed into the bucket, the bucket swings to the position shown in Figure 8, deposits the slug in the ladle 28, and returns to the position shown in Figures 5 and 7.

As soon as a metal slug has been deposited in the ladle 28, high frequency current is passed through the coil 34 by apparatus hereinafter described, to heat inductively and melt the metal slug. Thereupon, the ladle is lifted and tilted to pour the molten metal into the cavity of the mold 15 by means now to be described.

As already stated, in the design of the machine illustrated, six pouring ladles are provided, three on each side, as shown in the plan view of Figure 3. Each of the three ladles on one side is rigidly attached to a horizontal bar 60 and similarly the three ladles on the other side are attached to a horizontal bar 60a by means of connecting members 61 and 61a respectively. The bars 60 and 60a are arranged to be raised and rotated simultaneously to transfer the ladles from the slug melting position to the pouring position and back in repeated cycles of operation.

Figure 10:
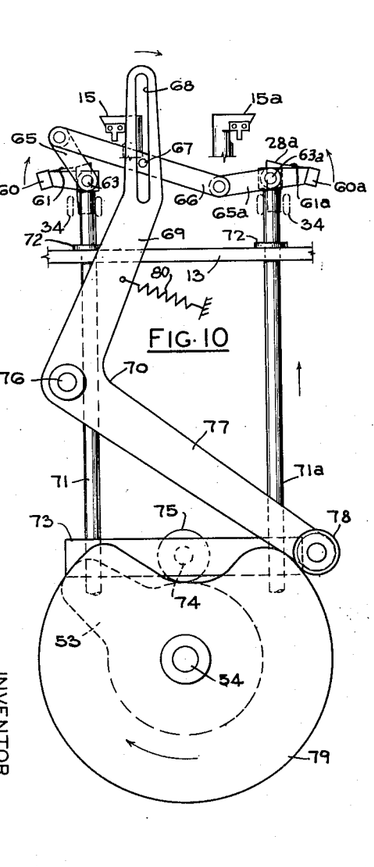
Figure 10 is a side elevational view of the mechanism for raising and tilting the ladles, showing the ladles in their lowermost position in the heating coils.
Figure 11:
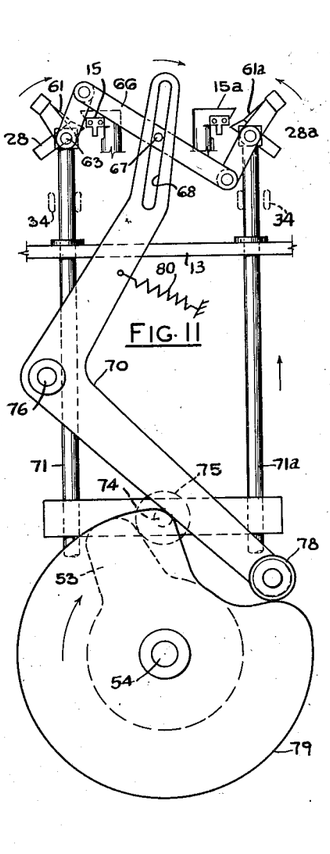
Figure 11 shows the mechanism of Figure 10 in an intermediate position.
Figure 12:
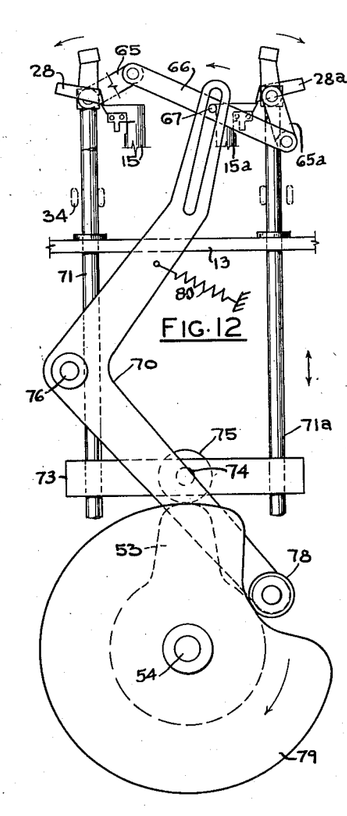
Figure 12 shows the same mechanism in the uppermost or pouring position of the ladles.

The mechanism for elevating and tilting the ladles is most clearly shown in Figures 10, 11 and 12, in which Figure 10 shows the initial position with the ladles in the slug receiving and melting position; Figure 11 shows an intermediate position; and Figure 12 shows the ladles in the pouring position.

Referring to Figure 3 it will be observed that the horizontal bars 60 and 60a are rigidly attached, as by members 62 and 62a respectively, to pairs of axially aligned horizontal shafts 63 and 63a, which shafts are mounted to rotate in bearings 64 and 64a respectively. The shafts at the left are provided with crank arms 65 and 65a. The free end of crank arm 65 is pivoted to the left-hand end of a connecting bar 66 as viewed in Fig. 10 and the free end of crank arm 65a is pivoted to the right-hand end of said bar 66 as viewed in Fig. 10. Projecting laterally from the middle point of connecting bar 66 is a pin 67 which is adapted to slide vertically in a slot 68 in the upper arm 69 of a bell crank 70 (Figure 10).

The bearings 64 for shaft 63 are each supported by vertical rods, one at either end of the shaft, one of which is shown at 71 in Figures 2, 10, 11 and 12. Similarly, the bearings 64a for shaft 63a are supported by vertical rods of which one is shown at 71a. These four vertical rods pass through guide bushings 72 in the platform 13 of the frame. The two rods at each end of the apparatus are rigidly attached to a cross bar, one of which is shown at 73, Figs. 10-12. The two cross bars are connected by a horizontal shaft 74 shown more clearly in Figure 1. On this shaft are rotatably mounted rollers or cam followers 75 and 75a, which are held by gravity against the peripheries of the cams 53 and 53a, previously described in connection with the slug transferring mechanism, of which cam 53 is shown in dotted lines in Figures 2, 10, 11 and 12, mounted on cam shaft 54. The function of this part of the mechanism, including the vertical rods 71 and 71a, the cross bars 73, the shaft 74, followers 75 and 75a and cams 53 and 53a, is simultaneously to raise and then to lower the six pouring ladles once during each revolution of the cam shaft 54, as illustrated in Figures 10, 11 and 12.

During the vertical travel of the ladles the pin 67 slides vertically in the slot 68 in the upper arm 69 of bell crank 70 (Figure 10). The latter is pivotally mounted on the frame at 76 and its lower arm 77 carries a roller or follower 78 which rides over the periphery of a tilting cam 79 mounted on the previously described cam shaft 54, whereby a fixed angular phase relation is maintained between cams 53 and 53a and cam 79. The follower is held against the cam by a tension spring 80 connected between the upper arm 69 of bell crank 70 and the frame structure, as shown in Figure 2. In the position shown in Figure 10, the rods 71 and 71a have dropped to their lowermost position and the arm 69 of bell crank 70 is farthest to the left. The ladles 28 and 28a are located vertically in the heating coils 34 and in position to receive and melt the metal slug as shown in Figure 8, being supported in such position by engagement of rollers 75 and 75a on the portion of cams 53 and 53a of smaller radius. Arcuate preventers 81 and 81a, Figs. 2 and 5, are fixed to the bars 60 and 60a respectively opposite each slug transferring mechanism and when the ladles are returning from pouring position ride against the buckets 38 and prevent the ladle mounting mechanisms from catching on the buckets.

As the cams 53 and 79 are rotated in the direction indicated by the arrows, Fig. 10, the apparatus presently assumes the intermediate position shown in Figure 11 in which rods 71 and 71a and ladles 28 and 28a have been raised vertically by cam 53 (acting cooperatively with cam 53a on the opposite end of the cam shaft) and the bell crank has been rotated clockwise, shifting pin 67 and connecting bar 66 to the right, thus partly tilting ladles 28 and 28a. Further rotation of cam shaft 54 brings the mechanism into the position shown in Figure 12 in which rods 71 and 71a and the ladles have reached their uppermost position and the ladles have been further tilted into pouring position adjacent the cavities of molds 15 and 15a. Further rotation of cam shaft 54 reverses the motions above described and restores the mechanism to the position shown in Figure 10.

It is to be noted that cams 53 and 53a function to operate the slug transferring mechanisms at a particular point of their rotation and that these same cams function to operated the ladle elevating mechanism at a different point of their rotation, approximately 180° removed from the first point.

At this stage of the process a predetermined quantity of molten metal, just sufficient to form a strap and terminal post, has been added to each of the six mold cavities surrounding the plate lugs but at a temperature insufficient to melt the lugs. An instant prior to the addition of the metal to the molds, high frequency current is applied to heat the floor and heat transfer member of each mold to take the chill from the molds, and on continued application, to superheat the metal surrounding the tips of the lugs and to melt said tips to effect an autogenous weld at that point, preferably without heating the balance of the lugs to the softening point which might produce faulting or weakening. It is preferable to apply heat to the molds before they receive the metal in order that the temperature of the molds may be approximately the same as that of the metal whereby the metal flows to all portions of the mold without freezing.

The duration of the heating current is accurately timed, as hereinafter described, the current being then interrupted and cooling water immediately passed through the cooling ducts in the molds. Upon solidifying of the metal, the castings are ejected from the molds by means hereinafter described. Preferably the base portions of the lugs are mechanically gripped by the strap castings, such gripping being the result of shrinkage of the castings on cooling.

Figure 13:
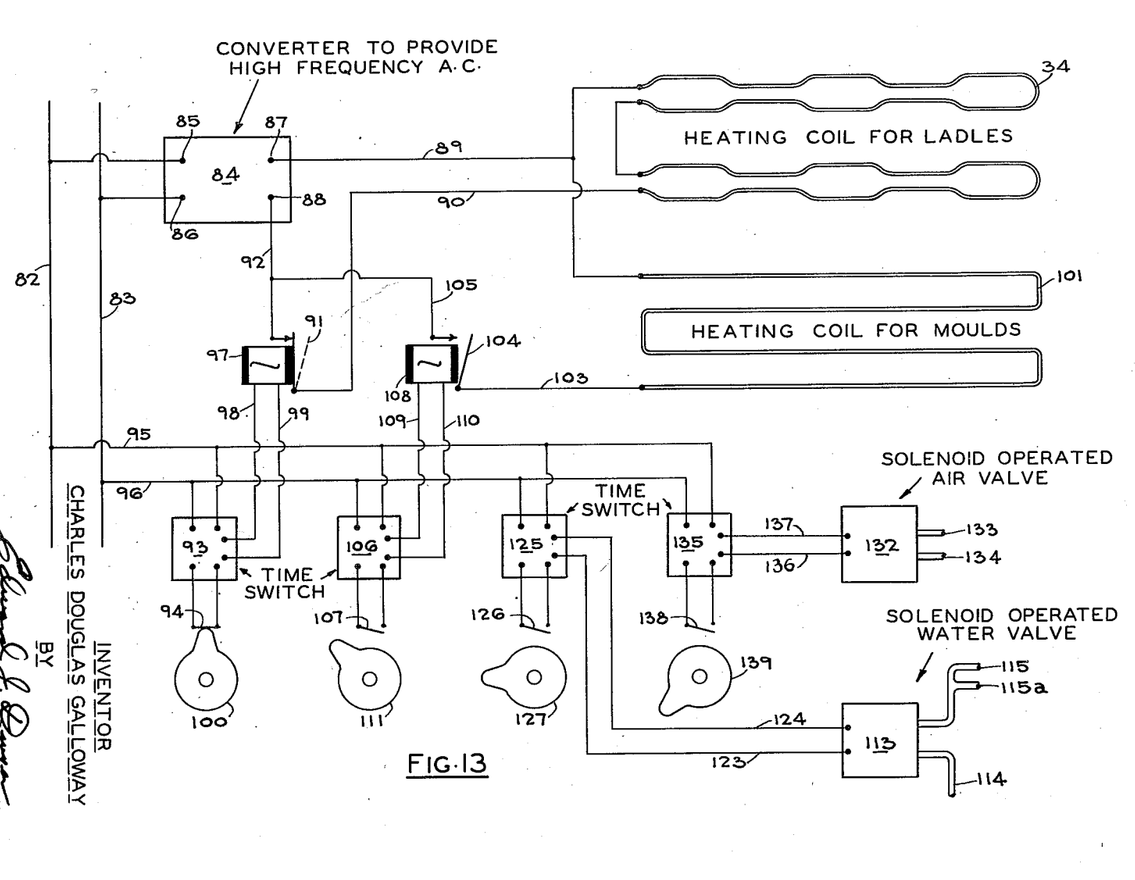
Figure 13 is a diagrammatic representation of the electrical circuits for the heating coils and solenoid operated valves for water and compressed air and means for controlling these circuits.

Referring to Figure 13, 82 and 83 represent the conductors from a source of electric current (not shown). At 84 is indicated a converter for converting the current supply to high frequency alternating current, the apparatus being connected to supply heating current selectively to the ladles and to the molds. The frequency of the current used may be of any magnitude in a range as wide as 20 kilocycles to 20 megacycles. Inasmuch as standard apparatus for producing such current is now on the market and its details per se form no part of this invention, further description is not deemed necessary. The input terminals of the converter are shown at 85 and 86 and the high frequency high potential output terminals at 87 and 88.

The heating coils for the ladles are shown at 34, Figures 3, 5, 8 and 13. They are preferably formed of hollow tubular conductors of considerable depth, whereby they substantially encompass the ladles while the latter are in slug receiving and melting position.

As shown in Figure 13, the circuit for the ladle heating coils extends from terminal 87, via conductor 89, heating coils 34, conductor 90, relay operated switch 91 and conductor 92 to terminal 88. The relay operated switch 91 for completing the circuit to the heating coils 34 is actuated by a time switch 93, which in turn is actuated by a cam operated control switch 94. The time switch 93 is connected to conductors 82 and 83 through conductors 95 and 96, and to a relay 97, which controls switch 91, through conductors 98 and 99. Control switch 94 is actuated by cam 100 mounted on cam shaft 54 (Figure 1). The closing of control switch 94 closes time switch 93 to complete the circuit through relay 97, which closes the circuit to heating coils 34. The time switch 93 is adjusted so that the relay 97 is energized for a sufficient length of time for the heating coils to melt the metal slug within the ladles. The closing of the control switch is synchronized with the transfer of a slug 31 to each ladle, so that energization takes place immediately following such transfer. Synchronization is accomplished by proper adjustment of the respective cams on the cam shaft 54. The structural details of the time switch and control switch and other similar switches employed in the apparatus are not shown for the reason that such devices are well known in the art.

The heating coils for the molds are indicated at 101, Figure 13, and their mechanical structure and relationship to the mold are shown in Figure 6. Preferably said heating coils are hollow tubular conductors and they are supported on insulators 102 mounted on bed plate 14. As shown in Figure 6, the heating coils are in close proximity to the mold floors and heat transfer members 20 without being in actual contact.

As shown in Figure 13, the circuit for the mold heating coils extends from terminal 87 of the converter, via conductor 89, heating coil 101, conductor 103, relay operated switch 104, conductor 105, conductor 92 to terminal 88 of the converter. The relay operated switch 104 for completing the circuit to the heating coil 101 is actuated by a time switch 106 which in turn is actuated by a cam operated control switch 107. The time switch 106 is connected to conductors 82 and 83 through conductors 95 and 96, and to a relay 108, which controls switch 104, through conductors 109 and 110. Control switch 107 is actuated by cam 111 mounted on cam shaft 54 (see Figure 1). The closing of control switch 107 closes time switch 106 to complete the circuit through relay 108, which closes the circuit to the mold heating coils 101. The time switch 106 is preferably adjusted so that the heating coils are energized for a sufficient length of time to superheat the molten metal in the mold and to melt only the tips of the lugs, whereby an autogenous weld is formed between the tips and the strap, but not to melt the lugs beyond the tips although it is obvious that adjustment could be such as to form a weld throughout the length of the lugs. The machine is synchronized so that the mold heating coil is energized an instant before the molten metal has been poured from the ladles into the molds in order that the molds may be at approximately the same temperature as the metal poured thereinto.

Figures 4, 9:
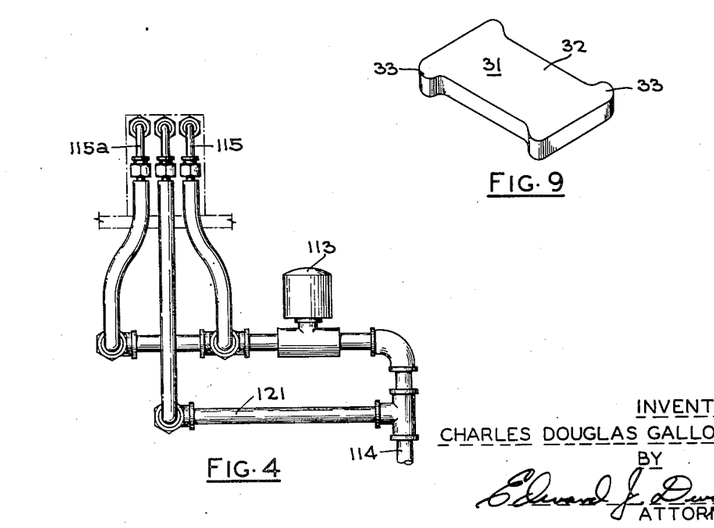
Figure 4 is an end elevational view of the pipe connections for supplying cooling water to the molds, looking in the direction 4—4, Figure 3.
Figure 9 is a perspective view of a metal slug of the preferred design for use with the machine of the present invention.

After the superheating of the molds by the energization of heating coils 101, the molds are immediately cooled by a stream of water or other coolant flowing through longitudinal ducts 112 therein, best shown in Figure 6. As shown in Figures 1 and 4, cooling water enters a solenoid controlled valve 113 from an external source 114. When the valve is opened, by means hereinafter described, the water flows therefrom through branch pipes 115 and 115a into parallel longitudinal ducts 116 and 116a in the bed plate 14, one of which ducts is adjacent the molds on each side of the machine (see Figure 5). Connecting tubes 117 extend from the duct 116 to parallel ducts 112 in the molds 15. The water discharges from ducts 112 through tubes 118, from which it drains into a common manifold 119 (Figure 1). Similarly connecting tubes 117a connect the duct 116a with ducts 112a in the molds 15a, from which the water drains into the manifold 119 through tubes 118a. Preferably a third duct 120 is provided in the bed plate 14, as shown in Figure 5, and is connected to the source pipe 114 ahead of the valve 113 through a pipe 121 and to the manifold 119 by a pipe 122. Water flows constantly through said third duct in order to maintain the bed plate in relatively cool condition.

The circuit for controlling valve 113 is shown in Figure 13. The solenoid of valve 113 is connected to the conductors 82 and 83 through conductors 123 and 124, time switch 125 and conductors 95 and 96. Time switch 125 is actuated by a cam operated control switch 126. When control switch 126 is closed by cam 127, the valve is opened for a predetermined interval sufficient for water flowing through ducts 112 and 112a to cool the mold sufficiently to solidify the contents thereof. The cam 127 is also mounted on cam shaft 54 and is adjusted so that the valve is opened immediately after the energization of the mold heating coils has ceased. The structural details of the solenoid operated valve are not shown for the reason that they are well known in the art.

After the strap castings have solidified and the valve 113 closed to stop flow of water through the ducts in the molds, the ejecting mechanism operates to eject the completed battery elements from the machine. As best shown in Figure 5, the ejecting mechanism comprises a series of ejecting pins 128, one of which is mounted to slide vertically in each post casting mold extension 18 and forms the bottom for the post cavity. The pins are fixed to a rack 129 beneath the bed plate 14 and which is supported for vertical movement on a plunger 130 that extends through the platform 13. As shown in Figure 1, said plunger extends into a cylinder 131 of a pneumatic ram that is controlled by a solenoid operated air valve 132, connected thereto by air lines 133 and 134.

The circuit for operating the air valve is shown in Figure 13. Said valve is connected to the conductors 82 and 83 through conductors 95 and 96, time switch 135 and conductors 136 and 137. Time switch 135 is actuated by cam operated control switch 138 which in turn is actuated by cam 139 mounted on cam shaft 54. The structural details of the air valve and ram are not shown for the reason that they are well known in the art.

The operation of a casting machine constructed as described is as follows:

An operator places an assembled element of positive plates, negative plates and interposed separators clamped together in each casting device $A_1$, $A_2$ and $A_3$ in inverted position with the lugs resting on the floors of the molds 15 and 15a and being positioned accurately by abutment with the positioning stops 23. In the cycle of operation sufficient time elapses between ejectment of previously formed elements and pouring of molten metal from the ladles into the molds to permit the operator to perform the step described.

In sequence, the following operations, which have been fully explained, take place: A slug is transferred from each trough to its transfer bucket and thence to the ladle; the heating coils surrounding the ladles are energized and the slugs are melted; the ladles are lifted and tilted and the molten metal poured therefrom into the molds, after which the ladles are returned to their initial positions; the heating coils around the molds are energized to superheat the molten metal and weld the tips of the lugs thereto, energization preferably taking place an instant before molten metal is poured into the molds; the molds are cooled to solidify the metal therewithin; the ejector mechanism operates to eject the finished elements from the molds.

The three elements to which straps have been cast are removed and placed in a battery casing to form a battery. It is unnecessary to trim the straps, since by virtue of introducing into the molds a predetermined quantity of metal, there is no excess to be trimmed away from the finished casting. As hereinbefore pointed out, the three elements are of the three types needed to form a battery in which certain of the posts are unsymmetrically located, although the number of cells and the post arrangement are subject to modification depending on the design of the battery.

I have found that the apparatus operates sastisfactorily in cycles of approximately one minute. Cycles of such duration allow sufficient time for the operator to perform the manual steps of placing the elements in the casting devices and removing them after they have been ejected, as well as for the apparatus to perform the various steps for the automatic casting of the straps. It is thus seen that the apparatus casts straps on elements rapidly and economically, particularly when compared with conventional methods of casting and handling straps of numerous design and subsequently burning them to the lugs.

While I have shown but a single embodiment of the present invention, it is apparent that the machine described is subject to modification without departing from the spirit of the invention. Therefore I do not wish to be limited by the disclosure set forth, but only by the scope of the appended claims.

I claim:

1. In an apparatus for casting straps on the terminal lugs of an assemblage of storage battery plates, the combination of frame supporting means, a pair of open cavity molds adapted to receive the terminal lugs of opposite polarity of an inverted assemblage of plates supported on said supporting means, a pair of rotatable shafts, pouring ladles mounted on said shafts, vertically movable members guided by said frame supporting means supporting said shafts for movement relative to said molds, a cam shaft journaled in said frame supporting means, cam means mounted on said cam shaft and adapted by its rotation to raise and lower the vertically movable members to transfer the ladles from a lower slug-receiving and melting position to an upper pouring position adjacent the mold cavities, said cam means retaining said ladle stationary in its lower melting position for a time interval, crank arms attached to the ladle supporting shafts, a pivotally mounted ladle-tilting member having arms adapted to engage said crank arms and upon actuation being effective to rotate said ladle supporting shafts thereby to tilt said ladles from the slug-receiving position to the pouring position, additional cam means on said cam shaft arranged to cooperate with the ladle-tilting member to actuate it and to rock it about its pivotal support, and an inductive heating coil in inductive proximity to the ladles in their lowermost position.

2. In a machine for casting straps on the terminal lugs of the plates in assembled storage battery elements, the combination of a frame, a pair of laterally spaced molds supported on said frame and having cavities adapted to receive the terminal lugs of the positive and negative plates respectively of an assembled storage battery element, a cam shaft journaled in said frame, ladles cooperative with said molds, means carried by said frame including elongated structure movable relative to said frame for supporting said ladles for vertical and tilting movement with respect to said frame, means for heating said ladles to melt a slug of casting metal therein, cam means on said cam shaft for operating said heating means for a predetermined interval after introduction of metal to said ladles, cam means on said cam shaft for elevating and tilting said ladles to pour molten metal into said molds, means for heating the molten metal in the molds, cam means on said cam shaft for controlling operation of said heating means to heat said molds for a predetermined interval after introduction of the molten metal, means for cooling said molds, cam means on said cam shaft for controlling operation of said cooling means to cool said molds for a predetermined interval after cessation of heating by said mold-heating means, means for ejecting an assemblage of plates and straps from said molds, and cam means on said cam shaft for operating said ejecting means after operation of said cooling means.

3. A machine for casting the straps on plates of a storage battery comprising frame supporting means, a strap-mold for receiving the lug ends of battery plates supported on said frame supporting means, a heater for localized heating of said mold along the region where the lugs project into said molds, a metal ladle, a carrier for said ladle carried by said frame and vertically movable relative to said frame and said mold, operating means for said carrier to move said ladle vertically from a heating station to a discharge position adjacent said mold and back to said heating station, heating means for said ladle at said heating station, and circuit controllers for controlling said heating means and said heater first to melt said slug when said ladle is at said heating station and then to heat said mold when said ladle and said molten metal therein is vertically moved to said discharge position.

4. In an apparatus for casting straps on the terminal lugs of assembled elements of storage battery positive plates, negative plates and separators, the combination of a frame, a pair of laterally spaced unitary molds supported by said frame and having open top cavities adapted to receive the terminal lugs of inverted positive and negative plates respectively of an assembled element, ladles disposed in cooperative relation with said molds, means for electrically heating said ladles to melt slugs of metal therein, means including vertically movable rods guided by said frame for bodily raising said ladles relative to said frame to register with said molds and for tilting said ladles to pour molten metal into said mold cavities, means for electrically heating said molds during and after the introduction of molten metal to weld the molden metal to the ends of the lugs, means for concurrently cooling said molds following the welding operation, and means associated with each mold for ejecting the cast strap from each mold for removal of each assembled element from the casting apparatus.

5. In an apparatus for casting straps on the terminal lugs of assembled elements of storage battery positive plates, negative plates and separators, the combination of a frame, a pair of laterally spaced unitary molds supported by said frame and having open top cavities adapted to receive the terminal lugs of inverted positive and negative plates respectively of an assembled element, ladles disposed for movement in cooperative relation with said molds, means for inductively heating the ladles to melt the metal therein, means for bodily raising said ladles relative to said frame to register with said molds and including rockable members supported by said frame for tilting said ladles to pour molten metal into said mold cavities, means for inductively and concurrently heating said molds upon the introduction of molten metal to weld the molten metal to the ends of the lugs, means for concurrently cooling the molds following the welding operation, means associated with each mold, for ejecting the cast strap from each mold, and means for initiating operation of said enumerated means in predetermined time sequence.

6. In an apparatus for casting straps on the terminal lugs of an assemblage of storage battery plates, the combination of a frame, a mold supported by said frame and having a cavity adapted to receive the terminal lugs of an inverted assemblage of plates, a ladle, inductive heating means associated with said ladle and operable following delivery of a slug to the ladle to heat said ladle and slug and thereby melt the slug, means including cams journaled in said frame and cam followers for elevating said ladle from said heating means into registry with said mold and for tilting said ladle to pour the molten metal into said mold cavity, inductive means for heating said mold for a predetermined interval after the introduction of molten metal to weld the ends of the lugs to the metal, means for cooling the mold following the welding operation, and means for ejecting the assemblage of plates and strap from the mold.

7. In an apparatus for casting straps on the terminal lugs of an assemblage of storage battery plates, the combination of a frame, a mold supported by said frame, a ladle, means including a vertically movable rod carried by said frame mounting said ladle for movement between a slug receiving position and a pouring position, an electric heating element, said ladle in the slug receiving position being substantially encompassed by said heating element, means for energizing said heating element following delivery of a slug to said ladle to melt the metal, and means for tilting said ladle in said pouring position to pour the molten metal of each slug into said mold.

8. In a machine for casting straps on the terminal lugs of the plates in assembled storage battery elements, the combination of a frame, a pair of laterally spaced molds supported on said frame and having cavities adapted to receive the terminal lugs of the positive and negative plates respectively of an assembled storage battery element, a cam shaft journaled in said frame, ladles for molten metal, means including vertically movable rods for supporting said ladles for movement from a heating position to an unloading position, said ladles being pivotally secured to said rods for pivotal movement for discharge of molten metal therefrom into said cavities, means for electrically heating said ladles to melt a slug of metal therein, an elevating cam carried by said cam shaft for elevating said rods and said ladles after melting of the metal therein, and a second cam carried by said cam shaft for rotating said ladles to pour the molten metal into said cavities, said cams thereafter returning said ladles to their respective heating positions.

9. In a machine for casting straps on the terminal lugs of the plates in assembled storage battery elements, the combination of a frame, a pair of laterally spaced molds supported on said frame and having cavities adapted respectively to receive the terminal lugs of the positive and negative plates of an assembled storage battery element, a cam shaft journaled in said frame, a ladle disposed outwardly of each of said molds, means including vertically movable rods guided by said frame for pivotally supporting each of said ladles for vertical and tilting movement with respect to said frame, each of said ladles being movable from a heating position to an elevated discharge position, a cam on said cam shaft for moving said rods to move said ladles between their said heating positions and their said discharge positions, inductive means for electrically heating each of said ladles and a slug therein to melt the slug of casting metal therein a crank arm, means pivotally connecting one end of said crank arm to said ladles for tilting movement thereof upon rotation of said crank arm, and a cam carried by said cam shaft for rotating said crank arm after elevation of said ladles to pour into said molds the molten metal in said ladles, said cams thereafter operating in sequence to return said ladles to their respective heating positions preparatory to the delivery thereto of a second slug of casting metal.

10. In a machine for casting straps on the terminal lugs of the plates in assembled storage battery elements, the combination of a frame, a mold supported on said frame and having a cavity adapted to receive the terminal lugs of the positive and negative plates respectively of an assembled storage battery element, a ladle for molten metal, a ladle supporting member slidably carried by said frame, an electric heating element mounted on said frame at one side of said mold, said ladle being movable by said supporting member from a slug-receiving position partially within said heating element to a pouring position adjacent said mold, a cam shaft journaled in said frame, an elevating cam secured to said shaft, means including a cam follower for actuating said supporting member to move said ladle from its slug-receiving position to a pouring position, a second cam, means including a second cam follower for tilting said ladle while in its pouring position to pour molten metal into said mold cavity, a magazine for slugs of casting metal each providing the amount of metal required for a strap, a slug carrier, a pivoted arm for said slug carrier for rotation of said carrier from a slug-receiving position with respect to said magazine through a part of said path of said ladle for delivery of a slug of casting metal to said ladle and means including a third cam follower engaging said first cam for delivering a slug from said magazine to said carrier for deposit thereby to said ladle while in said slug-receiving position, and means operable under the control of said cam shaft for energizing said heating element following delivery of a slug to said ladle to melt the metal therein prior to elevation thereof by said first cam.

11. In a machine for casting straps on the terminal lugs of the plates in assembled storage battery elements, the combination of a frame, a pair of laterally spaced molds supported on said frame and having cavities adapted respectively to receive the terminal lugs of the positive and negative plates of an assembled storage battery element, a cam shaft journaled in said frame, a ladle disposed outwardly of each of said molds for movement along a predetermined path with respect thereto, means including vertically movable rods pivotally supporting each of said ladles for tilting movement with respect thereto, said rods being guided by said frame in their said vertical movement, an elevating cam on said cam shaft, means including a first cam follower for moving said rods to move said ladles between slug-receiving and heating positions to discharge positions, inductive means for electrically heating each of said ladles for a slug of casting metal therein to melt the slug, a crank arm for each ladle for rotating the same, a link interconnecting said crank arms, a tilting cam secured to said cam shaft, a bell crank pivoted intermediate its ends to said frame, a second cam follower secured to one end of said bell crank and engaging said tilting cam, the opposite end of said bell crank having an elongated slot therein of length at least equal to the vertical movement of said rods from one position to the other, a driving element secured to said link and extending into said slot and movable vertically therein with vertical movement of said rods, and means including said tilting cam and said second cam follower for rotating said bell crank and said crank arms to tilt said ladles while in their pouring positions to pour the molten metal of each slug into said molds.

CHARLES DOUGLAS GALLOWAY.

REFERENCES CITED

The following references are of record in the file of this patent:

UNITED STATES PATENTS

| Number | Name | Date |
|---|---|---|
| 685,583 | Dodge | Oct. 29, 1901 |
| 902,134 | Burris | Oct. 27, 1908 |
| 1,235,779 | Engel | Aug. 7, 1917 |
| 1,811,292 | Barhoff | June 23, 1931 |
| 1,844,701 | Tama | Feb. 9, 1932 |
| 1,856,352 | Morris et al. | May 3, 1932 |
| 1,936,218 | Watkins | Nov. 21, 1933 |
| 1,948,120 | Lormor | Feb. 20, 1934 |
| 1,956,870 | Mayer | May 1, 1934 |
| 2,028,790 | Lund | Jan. 28, 1936 |
| 2,086,483 | Touceda et al. | July 6, 1937 |
| 2,363,759 | Waldie | Nov. 28, 1944 |
| 2,454,051 | Galloway | Nov. 16, 1948 |
| 2,454,053 | Galloway | Nov. 16, 1948 |